(12) United States Patent
Hill et al.

(10) Patent No.: US 8,040,331 B2
(45) Date of Patent: Oct. 18, 2011

(54) DUAL-MODE ROTATABLE INPUT DEVICE

(75) Inventors: Andrew Hill, Bellevue, WA (US); David Stephen Zucker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 12/344,431

(22) Filed: Dec. 26, 2008

(65) Prior Publication Data

US 2010/0164908 A1 Jul. 1, 2010

(51) Int. Cl.
*G06F 3/033* (2006.01)
*H03K 17/94* (2006.01)

(52) U.S. Cl. ........................................ 345/184; 345/163

(58) Field of Classification Search .................. None
See application file for complete search history.

(56) References Cited

U.S. PATENT DOCUMENTS

| | | | |
|---|---|---|---|
| 5,912,661 A | 6/1999 | Siddiqui | |
| 5,914,705 A * | 6/1999 | Johnson et al. | 345/163 |
| 6,128,006 A | 10/2000 | Rosenberg et al. | |
| 6,809,727 B2 | 10/2004 | Piot et al. | |
| 7,042,441 B2 | 5/2006 | Adams et al. | |
| 7,084,856 B2 | 8/2006 | Huppi | |
| 7,170,491 B2 * | 1/2007 | Montalcini | 345/157 |
| 7,173,637 B1 | 2/2007 | Hinckley et al. | |
| 7,843,430 B2 * | 11/2010 | Jeng et al. | 345/158 |
| 2003/0103044 A1 * | 6/2003 | Sunda et al. | 345/184 |
| 2005/0097468 A1 | 5/2005 | Montalcini | |
| 2005/0219216 A1 * | 10/2005 | Yoshikawa | 345/167 |
| 2006/0001657 A1 * | 1/2006 | Monney et al. | 345/184 |
| 2006/0274042 A1 | 12/2006 | Krah et al. | |
| 2007/0188453 A1 | 8/2007 | O'Sullivan | |
| 2007/0229456 A1 | 10/2007 | Pihlaja | |
| 2008/0094352 A1 | 4/2008 | Tsuk et al. | |
| 2009/0102817 A1 * | 4/2009 | Bathiche et al. | 345/184 |
| 2010/0164908 A1 * | 7/2010 | Hill et al. | 345/184 |

FOREIGN PATENT DOCUMENTS

JP 2001304880 A 10/2001

OTHER PUBLICATIONS

Nass, Richard, "High-end mouse is Revolutionary", retrieved at << http://www.techonline.com/product/underthehood/196600923 >>, Oct. 20, 2008, pp. 1-3. "MicroGear™ Precision Scroll Wheel and SmartShift™ Technology", retrieved at << http://www.logitech.com/lang/pdf/ib-microgear_and_smartshift_EN.pdf >>, Oct. 20, 2008, pp. 1-3.
Pat, "Logitech V200 Wireless Notebook Mouse", retrieved at << http://www.bentuser.com/article.aspx?ID=326&page=2 &AspxAutoDetectCookieSupport=1 >>, Oct. 17, 2008, pp. 1-3.
"International Search Report", Mailed Date: Aug. 17, 2010, Application No. PCT/US2009/069547, Filed Date: Dec. 26, 2009, pp. 9. (MS# 325699.02).

* cited by examiner

*Primary Examiner* — Peter Vincent Agustin
(74) *Attorney, Agent, or Firm* — Alleman Hall McCoy Russell & Tuttle LLP

(57) ABSTRACT

Embodiments related to dual mode rotatable input devices that permit both resistive and non-resistive rotation are disclosed. One embodiment comprises a stationary hub, a rotatable member rotatable around the stationary hub, and a resistive rotation mechanism forming an interface between the stationary hub and the rotatable member. The resistive rotation mechanism comprises a resistive surface and a movable interface member configured to selectively contact the resistive surface, wherein the resistive surface and the movable interface member move relative to one another with rotation of the rotatable member. The resistive mechanism further comprises a biasing mechanism that urges the movable interface member into engagement with the resistive surface when a rotational velocity of the rotatable member is below a threshold velocity, and allows separation of the interface member and the resistive surface when the rotational velocity of the rotatable member is above the threshold velocity.

20 Claims, 3 Drawing Sheets

DUAL-MODE ROTATABLE INPUT DEVICE

BACKGROUND

Many electronic devices utilize rotatable inputs to allow a user to make an input by rotating a dial, wheel, or the like. As one example, computer mice often include scroll wheels rotatable by a user to scroll a list, a document, or other object displayed on a graphical user interface of a computing device.

Various rotatable input devices include mechanical features that facilitate fine-scale input control. For example, some scroll wheels may include indexing features that cause the scroll wheels to rotate in a stepped manner, while other scroll wheels may utilize frictional resistance to allow fine control over a continuous range of positions. However, in either case, such fine control mechanisms may impede rapid scrolling through large lists.

SUMMARY

Accordingly, various embodiments related to dual mode rotatable input devices are disclosed herein that permit both resistive and non-resistive rotation. For example, one disclosed embodiment provides a rotatable input device for an electronic device, wherein the input device comprises a stationary hub, a rotatable member configured to be rotatable around the stationary hub by a user, and a resistive rotation mechanism forming an interface between the stationary hub and the rotatable member. The resistive rotation mechanism comprises a resistive surface and a movable interface member configured to selectively contact the resistive surface, wherein the resistive surface and the movable interface member are configured to move relative to one another with rotation of the rotatable member. The resistive mechanism further comprises a biasing mechanism configured to urge the movable interface member into engagement with the resistive surface when a rotational velocity of the rotatable member is below a threshold velocity, and to allow separation of the interface member and the resistive surface when the rotational velocity of the rotatable member is above the threshold velocity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
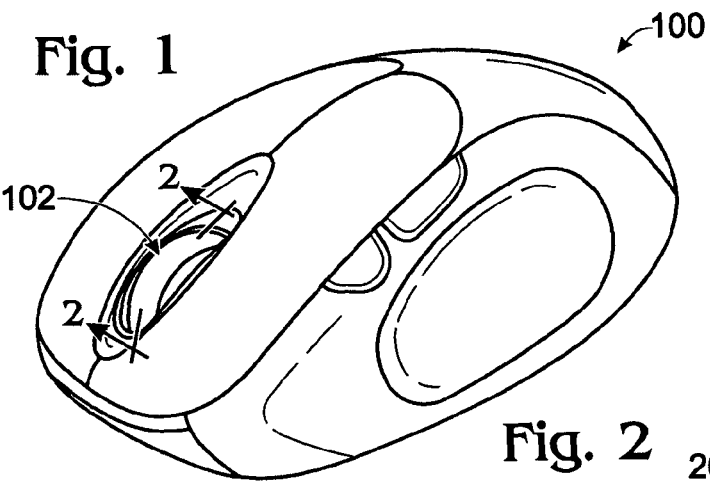
FIG. 1 shows a view of an embodiment of a computer mouse with a rotatable input device in the form of a scroll wheel.

Various embodiments of rotatable input devices are disclosed herein that are selectively changeable between resistive and non-resistive rotation modes to allow both fine control at low rotation velocities and rapid movement through a large range of items at high rotation velocities. For example, FIG. 1 shows an embodiment of a computer mouse 100 having a scroll wheel 102 that may be used to scroll through a list of items on a graphical user interface of a computing device.

Figure 2:
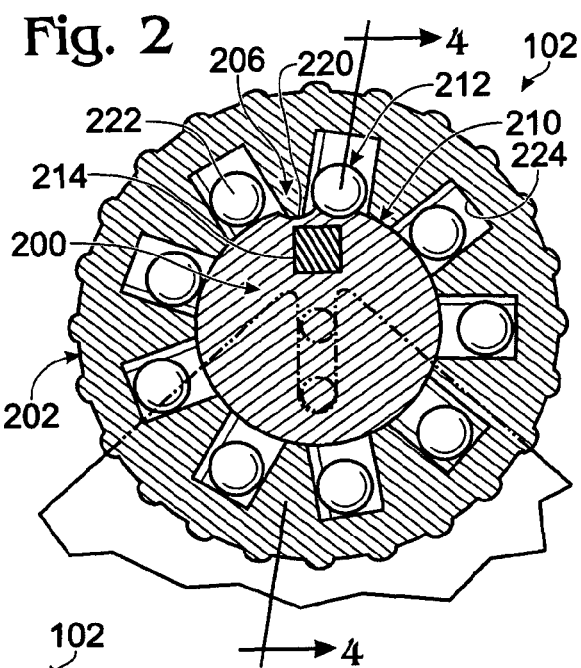
FIG. 2 shows a view of an embodiment of a dual-mode scroll wheel for a computer mouse, and illustrates a first mode of the scroll wheel.
Figure 3:
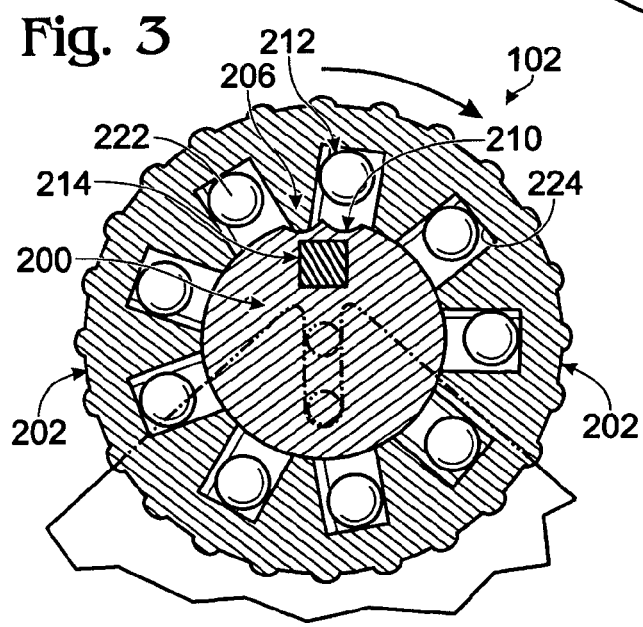
FIG. 3 illustrates a second mode of the scroll wheel of FIG. 2.

FIG. 2 shows a sectional view of the scroll wheel 102 when at rest or being rotated at a low rotational velocity, and FIG. 3 shows a sectional view of the scroll wheel 102 when rotated at a higher rotational velocity. The scroll wheel 102 comprises a stationary hub 200, a rotatable member 202 (i.e. the outer portion of the scroll wheel 102 that is manipulated by a user), and a resistive rotation mechanism, indicated generally at 206, that forms an interface between the stationary hub 200 and the rotatable member 202. While disclosed herein in the context of a scroll wheel for a mouse, it will be understood that the rotatable input device of FIGS. 2-3 may be used with any other suitable rotatable control, and in any suitable use environment. It will be understood that motion of the scroll wheel 102 may be tracked via optical encoding, or via any other suitable method. Such motion tracking mechanisms are omitted from these figures for the purposes of clarity.

The depicted resistive rotation mechanism 206 comprises an indexed surface 210, and one or more moveable interface members 212 configured to selectively interface with the indexed surface 210, depending upon a velocity at which the rotatable member 202 is rotated by a user. The resistive rotation mechanism 206 also comprises a biasing mechanism 214 configured to urge the moveable interface members 212 into engagement with the indexed surface 210 when the rotational velocity of the rotatable member 202 is below a threshold velocity, and to separate the interface members 212 and the indexed surface 210 when the rotational velocity of the rotatable member 202 is above the threshold velocity. In this manner, the rotatable member 202 automatically switches between resistive and non-resistive rotation depending upon how fast a user rotates the scroll wheel 102. It will be understood that other embodiments may utilize a non-indexed resistive surface without such detents, but that otherwise operates in a like manner. Further, it will be understood that the term "resistive rotation" as used herein denotes any "fine control" rotation mode that has additional friction or other resistance (indexed or non-indexed) compared to a lower-resistance mode of rotatable input device, and the term "non-resistive rotation" denotes any rotation mode that has lower friction or other resistance compared to a fine control mode.

The use of scroll wheel 102 in a computer mouse provides a simple and effective dual mode (resistive/non-resistive) scroll wheel for a computer mouse that switches between the modes without any input from a user other than ordinary manipulation of the scroll wheel that occurs during normal use. This is in contrast to other dual mode scroll wheels, which have a button or other control selectable by a user to switch between resistive and non-resistive rotation, for example, via a motor or mechanical coupling that engages or disengages a resistance mechanism.

A rotatable input device according to the present disclosure may utilize any suitable structure or structures to add resistance to lower velocity operation. For example, in the embodiment depicted in FIGS. 2-3, the indexed surface 210 comprises a plurality of detents 220 formed on an outer radial perimeter of the stationary hub 200, and the movable interface member comprises a plurality of bearings 222 each disposed within a corresponding internal space 224 formed in the rotatable member 202 that has an opening facing the indexed surface 210. The internal space 224 may be referred to herein as a "bearing holder" in the context of specific embodiments that utilize bearings as a movable interface member.

Further, the biasing mechanism 214 comprises a magnet 226 disposed within the stationary hub at a location adjacent to the detents. When the scroll wheel 102 is rotated at a rotational velocity less than a threshold velocity, the attraction between the magnet 226 and each bearing 222 is sufficient to pull the bearing into the detents 220 as each bearing 222 is moved past the detents 220. Therefore, at these rotational velocities, the movement of each bearing 222 into and out of the detents 220 gives the rotation of the scroll wheel 102 an indexed feel that allows precise control for fine-scale input control.

On the other hand, as illustrated in FIG. 3, where the rotational velocity of the scroll wheel 102 is above the threshold velocity, the attractive force of the magnet 226 is insufficient to overcome the centripetal force exerted by the bearings 222 against the "bottom" surfaces in internal spaces 224 (i.e. the surfaces of the internal spaces farthest from the stationary hub 200). Therefore, when operated at these rotational velocities, the bearings 222 do not engage with the detents, allowing the scroll wheel 102 to freely spin without indexed movement. In this manner, the scroll wheel 102 may be "flicked" at a high rotational velocity to facilitate scrolling through large documents via unindexed, unimpeded motion of the scroll wheel.

The various dimensions of the stationary hub 200, rotatable member 202, bearings 222, internal spaces 224, and other parts of the scroll wheel 102 may have any suitable values. For example, the mass of each bearing 222 and the depth of the bearing holders 224 may be selected to tailor the centripetal force threshold between resistive and non-resistive rotation to fall at a desired rotational velocity. For example, in one specific embodiment configured to enable non-resistive rotation of the scroll wheel at 1000 rpm, each bearing may have a mass of approximately 50 mg and each bearing holder 224 may have a depth of between approximately 1.5-3 mm.

Likewise, a number of and spacing of detents compared to a number of and spacing of bearings may be selected to tailor the spacing between indices to a desired value in light of an amount of space available on the rotatable member 202 and/or the stationary hub 200. For example, where it is desired to have relatively closely spaced indices, there may be insufficient space to increase a number of bearings within the rotatable member 202. Therefore, as shown in FIGS. 2-3 two or more detents 220 may be provided on the indexed surface 210 so that each bearing encounters multiple detents. In this manner, a radial spacing between indices may be increased without increasing a number of bearings within the rotatable member 202. As a more detailed example, if it is desired to have 20 degrees between indices, a scroll wheel may be provided with eighteen bearings and one detent, nine bearings and two detents, six bearing and three detents, etc. While the depicted movable interface member comprises one or more bearings, it will be understood that any other suitable structure may be used as moveable interface member, including but not limited to pins, rollers, etc.

The level of resistance encountered at each index may be tailored by selection of detent depth and profile, as well as magnet strength. For example, relatively high-resistance indices may be formed via the use of a relatively stronger magnet and/or relatively deeper detents, while relatively lower resistance indices may be formed via the use of a relatively weaker magnet and/or relatively shallower detents.

In some embodiments, the surfaces within each bearing holder 224 may comprise a relatively soft surface configured to reduce noise from the movement of bearings 222 within the bearing holders 224 during use. For example, a two-shot injection molding process may be used to form rotatable member 202, stationary hub 200, etc. from a hard plastic, and to form a softer plastic or elastomeric coating within the bearing holders 224 and/or over indexed surface 210. In one specific embodiment, the rotatable member is formed from an acetyl plastic with an approximately 1 mm thick thermoplastic elastomeric coating formed within the bearing holders 224.

Figure 5:
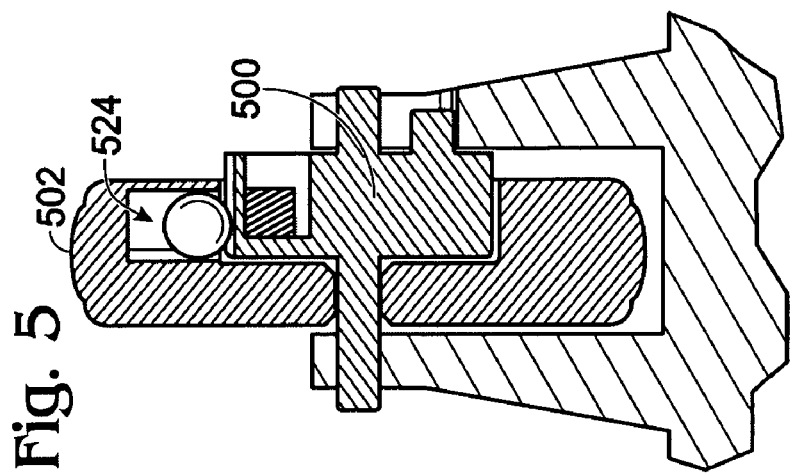
FIG. 5 shows an embodiment of a dual-mode scroll wheel having bearing channels oriented in a plane of the scroll wheel.
Figure 4:
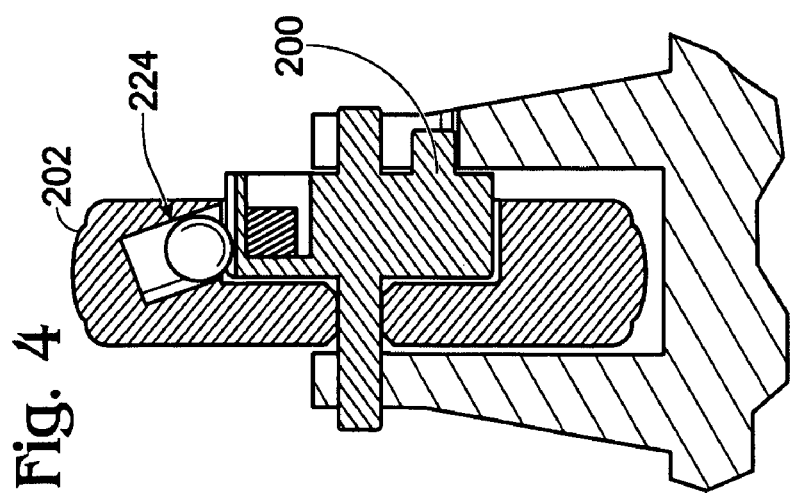
FIG. 4 shows an embodiment of a dual-mode scroll wheel having bearing channels oriented out of a plane of the scroll wheel.

FIGS. 4 and 5 show sectional views of two embodiments of scroll wheels taken along a direction normal to a rotational axis of the scroll wheels. First referring to FIG. 4, the bearing holders 224 are arranged at an angle relative to a plane in which the rotatable member 202 rotates. This may help to prevent bearings from rolling out of the bearing holders 224 during device construction. Alternatively, as shown in FIG. 5, the bearing holders 524 may be arranged parallel to the plane in which the rotatable member 502 rotates on stationary hub 500.

Figure 6:
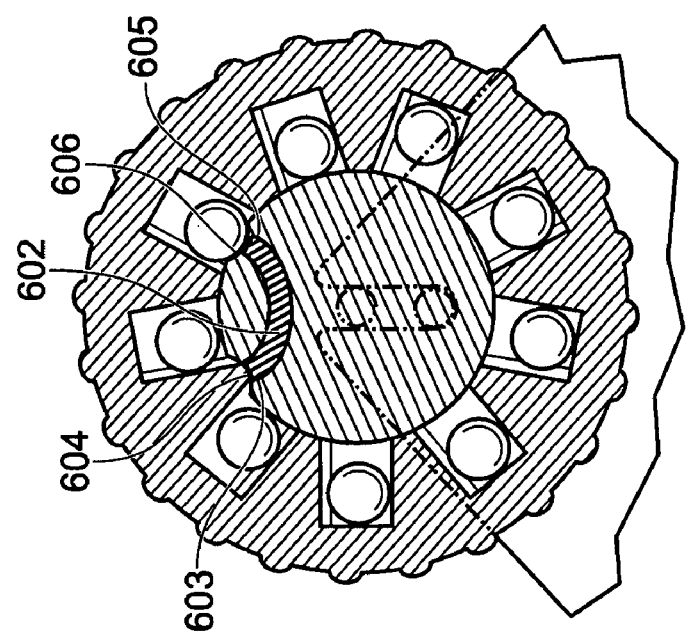
FIG. 6 shows an embodiment of a dual-mode scroll wheel having one magnet corresponding to two detents.

The embodiment of FIGS. 2 and 3 show the use of a single magnet disposed beneath two closely-spaced detents such that a single pole of the magnets provides the biasing force associated with both detents. In other embodiments, one magnet may be provided for each detent. In yet other embodiments, both poles of a single magnet may be utilized to provide biasing force for two detents. FIG. 6 shows an embodiment of a scroll wheel 600 in which a single U-shaped magnet 602 is used to provide biasing force for two detents 604, 606. A first pole 603 of the U-shaped magnet 602 is located adjacent to a first detent 604, and a second pole 605 of the U-shaped magnet is located adjacent to a second detent 606. By utilizing both poles of a magnet in this manner, a single magnet can be used to efficiently provide biasing force to two detents. This may allow space within the stationary hub to be used efficiently.

Figure 7:
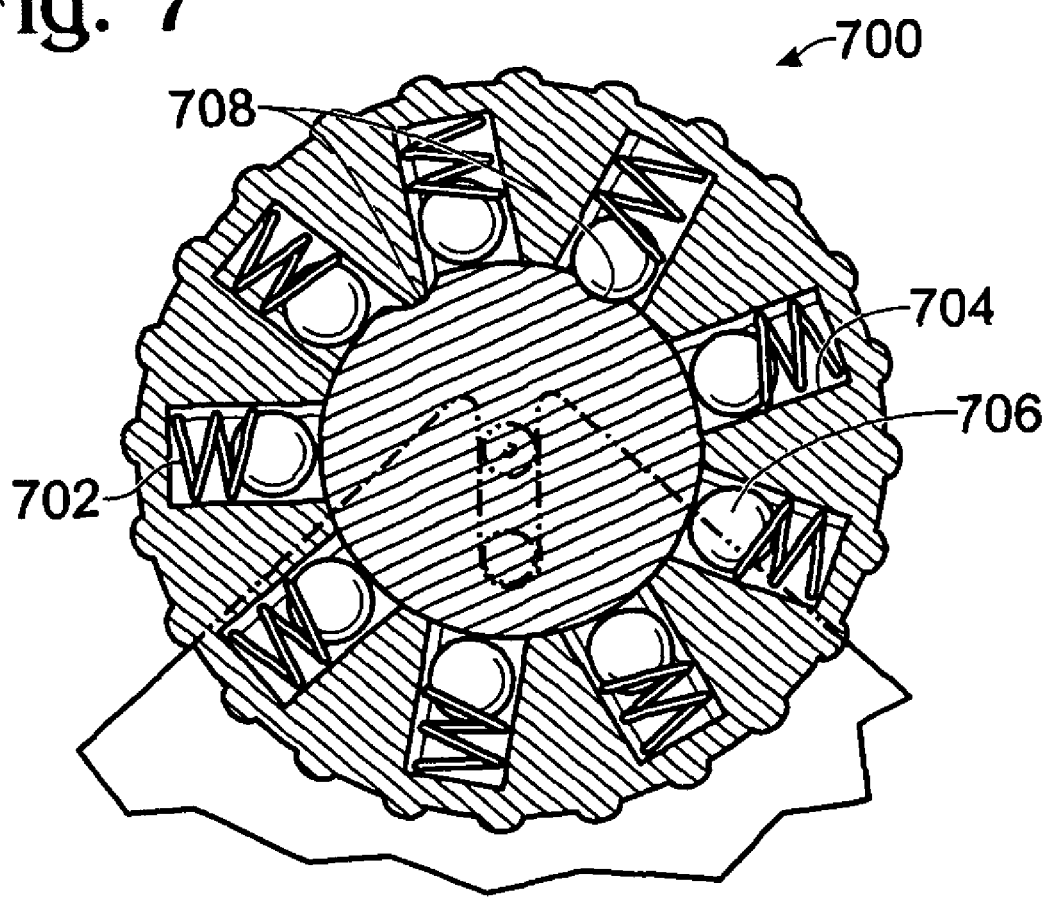
FIG. 7 shows an embodiment of a dual-mode scroll wheel utilizing a plurality of springs as a biasing mechanism.

FIG. 7 shows another embodiment of a rotatable input device 700 according to the present disclosure. Instead of utilizing one or more magnets to provide biasing force, input device 700 utilizes a spring 702 disposed within each internal space 704 to bias movable interface members in the form of bearings 706 toward a resistive surface 708. While coil sprigs are shown as springs 702, it will be understood that any other suitable type of spring may be used, including but not limited to leaf springs, etc.

In the depicted embodiments, the movable interface member is shown as being incorporated into a rotatable member of a scroll wheel, and the resistive surface against which the interface member is biased is shown as being disposed on an outer surface of a stationary hub. However, in other embodiments, a movable indexed surface may be located on a rotatable portion of a scroll wheel, and the interface member may be located on a stationary hub. Further, in other embodiments, both the resistive surface and interface member may be located on structures external to the scroll wheel that are, for example, connected to the rotatable member of the scroll wheel via a drive shaft, suitable gearing, etc. In yet other embodiments, the movable interface member may comprise one or more pins disposed within the rotatable member that are configured to strike elastomeric ridges that extend from the stationary hub toward the rotatable member.

The depicted embodiments allow a user to select between rotation modes simply by changing a rotational velocity of a rotatable input member. The disclosed rotatable input devices do not utilize complex assembly procedures, and operate entirely on mechanical principles. Therefore, the use of the disclosed rotatable input devices with computer mice does not affect the optical encoder or electronics of a mouse, thereby facilitating use of the disclosed input devices in existing mouse designs. It should be understood that the dual-mode rotation configurations and/or approaches described herein are exemplary in nature, and that these specific embodiments or examples are not to be considered in a limiting sense, because numerous variations are possible. The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A rotatable input device for an electronic device, the input device comprising:
   a stationary hub:
   a rotatable member rotatable around the stationary hub by a user;
   a resistive rotation mechanism forming an interface between the stationary hub and the rotatable member, the resistive rotation mechanism comprising a resistive surface and a movable interface member configured to selectively interface with the resistive surface, wherein the resistive surface and the movable interface member are configured to move relative to one another with rotation of the rotatable member; and
   a biasing mechanism configured to urge the movable interface member into engagement with the resistive surface when a rotational velocity of the rotatable member is below a threshold velocity, and to separate the interface member and the resistive surface when the rotational velocity of the rotatable member is above the threshold velocity.

2. The rotatable input device of claim 1, wherein the input device comprises a scroll wheel on a computer mouse.

3. The rotatable input device of claim 1, wherein the resistive surface comprises a detent formed in a surface of the stationary hub.

4. The rotatable input device of claim 3, wherein the movable interface member comprises a bearing disposed in a bearing holder formed in the rotatable member, the bearing holder comprising an opening facing the resistive surface.

5. The rotatable input device of claim 3, wherein the biasing mechanism comprises a magnet located within the stationary hub adjacent to the detent.

6. The rotatable input device of claim 3, further comprising a plurality of detents formed in the surface of the stationary hub.

7. The rotatable input device of claim 6, wherein the biasing mechanism comprises a magnet with a first pole located adjacent a first detent and a second pole located adjacent a second detent.

8. The rotatable input device of claim 1, wherein the biasing mechanism comprises a magnet.

9. The rotatable input device of claim 1, wherein the biasing mechanism comprises a spring.

10. A computer mouse, comprising:
    a scroll wheel rotatable by a user of the computer mouse;
    an indexed surface and a movable interface member associated with the scroll wheel, wherein rotation of the scroll wheel causes relative movement between the indexed surface and the movable interface member; and
    a biasing mechanism configured to urge the movable interface member and indexed surface into engagement when a rotational velocity of the scroll wheel is below a threshold velocity, and to allow the movable interface member and the indexed surface to separate when the rotational velocity of the scroll wheel is above the threshold velocity.

11. The computer mouse of claim 10, wherein the scroll wheel comprises a rotatable member and a stationary hub, and wherein the indexed surface comprises a detent formed in a surface of the stationary hub.

12. The computer mouse of claim 11, wherein the rotatable member comprises a bearing holder with an opening facing the indexed surface, and wherein the movable interface member comprises a bearing located within the bearing holder.

13. The computer mouse of claim 12, wherein the biasing mechanism comprises a magnet located within the stationary hub adjacent to the detent.

14. The computer mouse of claim 13, wherein the biasing mechanism comprises a magnet with a first pole located adjacent a first detent and a second pole located adjacent a second detent.

15. The computer mouse of claim 10, wherein the biasing mechanism comprises a spring.

16. A computer mouse, comprising:
    a body; and
    a scroll wheel coupled to body, the scroll wheel comprising:
    a stationary hub coupled to the body and configured to remain stationary relative to the body during scroll wheel use;
    a detent formed in the stationary hub;
    a magnet disposed within the stationary hub at a location adjacent to the detent;
    a rotatable wheel member disposed around the stationary hub and comprising an internal space having an opening facing the stationary hub; and
    a movable interface member disposed in the internal space.

17. The computer mouse of claim 16, wherein the movable interface member comprises a bearing.

18. The computer mouse of claim 16, further comprising one or more of a magnetic detector or inductive detector configured to track motion of the scroll wheel via movement of the movable interface member through a magnetic field emanating from the magnet.

19. The computer mouse of claim 16, wherein the internal space has an axial direction that is offset from a central plane of the scroll wheel.

20. The computer mouse of claim 16, wherein the internal space has an axial direction that is parallel to a central plane of the scroll wheel.

* * * * *